United States Patent
Fujiyama

(10) Patent No.: US 7,537,082 B2
(45) Date of Patent: May 26, 2009

(54) ELECTRIC POWER STEERING SYSTEM

(75) Inventor: Kenichi Fujiyama, Ama-gun (JP)

(73) Assignee: JTEKT Corporation, Osaka-shi (JP)

( * ) Notice: Subject to any disclaimer, the term of this patent is extended or adjusted under 35 U.S.C. 154(b) by 201 days.

(21) Appl. No.: 11/617,887

(22) Filed: Dec. 29, 2006

(65) Prior Publication Data

US 2007/0169987 A1 Jul. 26, 2007

(30) Foreign Application Priority Data

Jan. 20, 2006 (JP) .............................. 2006-012720

(51) Int. Cl.
*B62D 5/04* (2006.01)
(52) U.S. Cl. ..................... 180/446; 180/404; 180/443
(58) Field of Classification Search .................. 180/404, 180/443, 446
See application file for complete search history.

(56) References Cited

U.S. PATENT DOCUMENTS

| | | | |
|---|---|---|---|
| 4,800,974 A | | 1/1989 | Wand et al. |
| 7,176,646 B2 * | | 2/2007 | Iwazawa ..................... 318/432 |
| 2006/0087269 A1 * | | 4/2006 | Iwazawa ..................... 318/432 |
| 2006/0282565 A1 * | | 12/2006 | Kumaido et al. .............. 710/41 |
| 2007/0068727 A1 * | | 3/2007 | Miura et al. ................ 180/446 |
| 2007/0116135 A1 * | | 5/2007 | Tsuchida ..................... 375/259 |
| 2007/0120530 A1 * | | 5/2007 | Nozaki ........................ 320/130 |
| 2008/0078608 A1 * | | 4/2008 | Hara et al. .................. 180/446 |

FOREIGN PATENT DOCUMENTS

| | | |
|---|---|---|
| DE | 100 41 587 A1 | 3/2001 |
| EP | 0 361 725 A1 | 4/1990 |
| EP | 0 901 217 A1 | 3/1999 |
| EP | 1 319 576 A2 | 6/2003 |
| JP | 2001-66200 | 3/2001 |

* cited by examiner

*Primary Examiner*—Paul N Dickson
*Assistant Examiner*—Tashiana Adams
(74) *Attorney, Agent, or Firm*—Oblon, Spivak, McClelland, Maier & Neustadt, P.C.

(57) ABSTRACT

An electric power steering system includes an assisting electric motor for assisting steering force according to a vehicle speed and a steering torque, a power supply source and an electric power steering controlling portion for supplying power to the assisting electric motor from the power supply source for controlling the assisting electric motor. The electric power steering controlling portion completely stops the controlling of the assisting electric motor being controlled and stops operating when the power supply source is in a first abnormal state and temporarily stops the controlling of the assisting electric motor being controlled until the power supply source returns to a normal state from a second abnormal state when the power supply source is in the second abnormal state.

13 Claims, 3 Drawing Sheets

ELECTRIC POWER STEERING SYSTEM

CROSS REFERENCE TO RELATED APPLICATIONS

This application is based on and claims priority under 35 U.S.C. §119 to Japanese Patent Application 2006-012720, filed on Jan. 20, 2006, the entire content of which is incorporated herein by reference.

FIELD OF THE INVENTION

This invention generally relates to an electric power steering system. More specifically, this invention pertains to an electric power steering system including an assisting electric motor for assisting steering force.

BACKGROUND

An electric power steering system includes an assisting electric motor and an electric power steering controlling portion for controlling the assisting electric motor. In a situation where the controlling portion turns to an abnormal state, the electric power steering controlling portion stops the controlling of the assisting electric motor without discomforting a driver while operating the steering wheel. For example, in a system described in JP2001-66200A (Patent document 1), in a situation where external noises are mixed with a torque sensor circuit signal and a level of output of a signal processing circuit abnormally rises or falls even for a short time, assist force is not abruptly reduced, but is gradually reduced.

The electric power steering system includes, in addition to the assisting electric motor and the electric power steering controlling portion described above, a power supply source for supplying power to the electric power steering controlling portion. Conventionally, in a situation where the power supply source turns to an abnormal state, the electric power steering system completely stops the controlling of the assisting electric motor and stops operating regardless of abnormal state conditions.

However, assisting the steering force by the electric power steering system is an important function in recent vehicles. Accordingly, it is desired that a state, where the electric power steering system is functioning, be retained as much as possible.

A need thus exists for an electric power steering system, in which an electric power steering controlling portion does not completely stops controlling of an assisting electric motor and keeps a state where the electric power steering controlling portion operates according to abnormal state conditions even when a power supply source turns to an abnormal state. The present invention has been made in view of the above circumstances and provides such an electric power steering system

SUMMARY OF THE INVENTION

According to an aspect of the present invention, an electric power steering system includes an assisting electric motor for assisting steering force according to a vehicle speed and a steering torque, a power supply source and an electric power steering controlling portion for supplying power to the assisting electric motor from the power supply source for controlling the assisting electric motor. The electric power steering controlling portion completely stops the controlling of the assisting electric motor being controlled and stops operating when the power supply source is in a first abnormal state and temporarily stops the controlling of the assisting electric motor being controlled until the power supply source returns to a normal state from a second abnormal state when the power supply source is in the second abnormal state.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
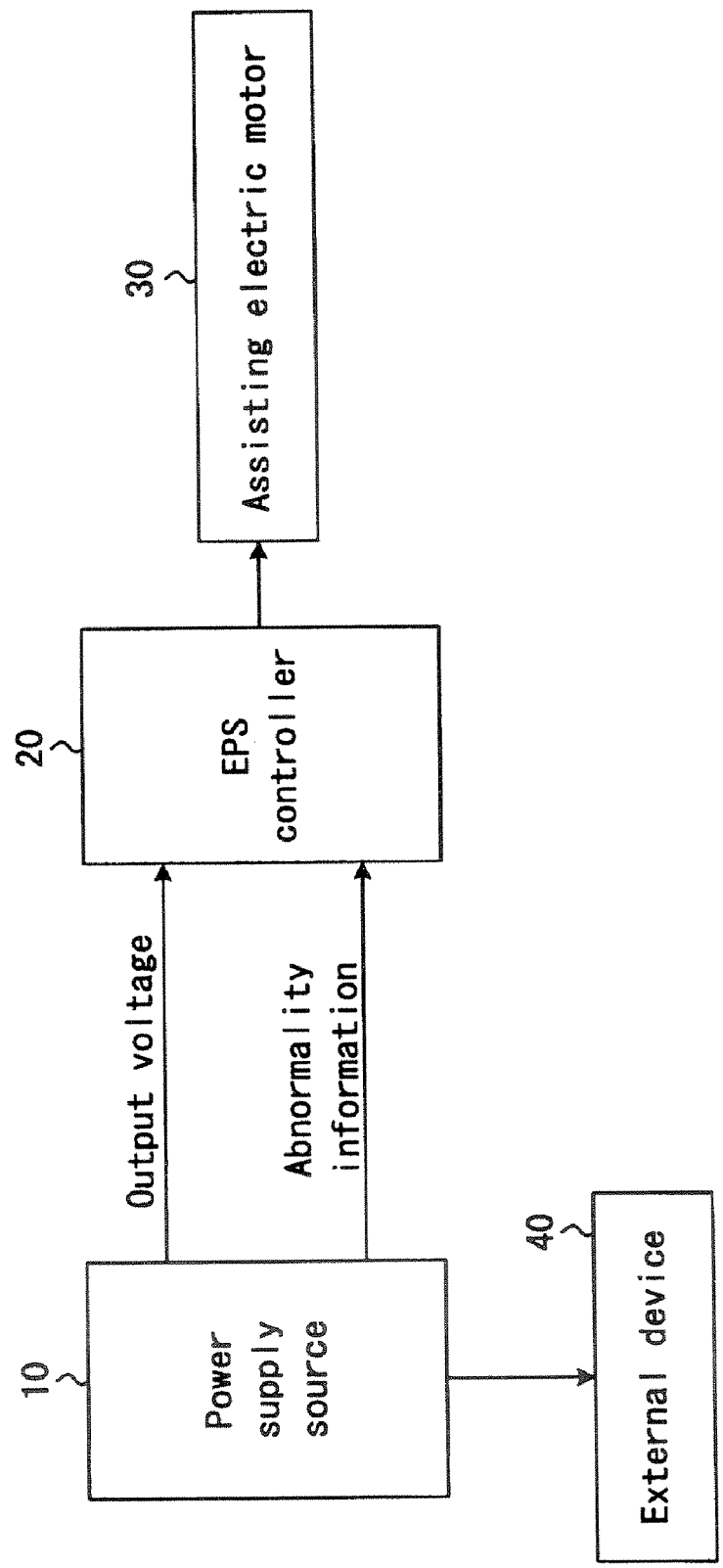
FIG. 1 represents a block diagram illustrating a configuration of an electric power steering system.

An embodiment of the present invention will be explained with reference to drawings. A configuration of an electric power steering system according to the embodiment will be explained with reference to FIG. 1. FIG. 1 represents a block diagram illustrating a configuration of the electric power steering system.

As illustrated in FIG. 1, the electric power steering system includes a power supply source 10, an electric power steering (EPS) controller 20 and an assisting electric motor 30.

The power supply source 10 includes a vehicle battery and a voltage increasing/decreasing circuit for increasing or decreasing a voltage outputted from the vehicle battery, or the like. The power supply source 10 supplies power to the EPS controller 20 described below. Further, the power supply source 10 supplies power to an external device 40 other than the EPS controller 20. Further, the power supply source 10 outputs abnormality information of the power supply source 10 to the EPS controller 20.

The abnormality information includes abnormality of a driving circuit, abnormality of overheat protection of the driving circuit, abnormality of a microcomputer, abnormality of an electrically erasable programmable read-only memory (EEPROM), abnormality of an external device requirement, or the like. Here, the abnormality of the driving circuit is a situation where the driving circuit itself turns to an abnormal state, for example, a situation where overcurrent flows, a situation where overvoltage is applied, or the like. The abnormality of overheat protection is an abnormal state in which the driving circuit overheats. The abnormality of overheat protection includes abnormality of overheat protection 1, which is an abnormal state of relatively lower temperature, and abnormality of overheat protection 2, which is an abnormal state of relatively higher temperature. The abnormality of microcomputer or the abnormality of EEPROM is a situation, in which a microcomputer or an EEPROM, which configures the power supply source 10, turns to an abnormal state. The abnormality of external device requirement is a situation, in which the power supply source 10 cannot apply voltage to the EPS controller 20 in a case where, for example, the external device 40 requires very high voltage from the power supply source 10.

The EPS controller 20 (an electric power steering controlling portion according to the embodiment of the present invention) controls the assisting electric motor 30 on the basis of outputs from a steering torque sensor (not illustrated) and a vehicle speed sensor (not illustrated). More precisely, the EPS controller 20 supplies power to the assisting electric motor 30 so that the assisting electric motor 30 outputs assisting steering force calculated according to a steering torque and a vehicle speed. For supplying power to the assisting electric motor 30, the EPS controller 20 inputs an output voltage outputted from the power supply source 10 to the assisting electric motor 30. In the meantime, the assisting electric motor 30 is configured from, for example, a brushless direct current (DC) motor, and provided at a rack shaft (not illustrated).

Figure 2:
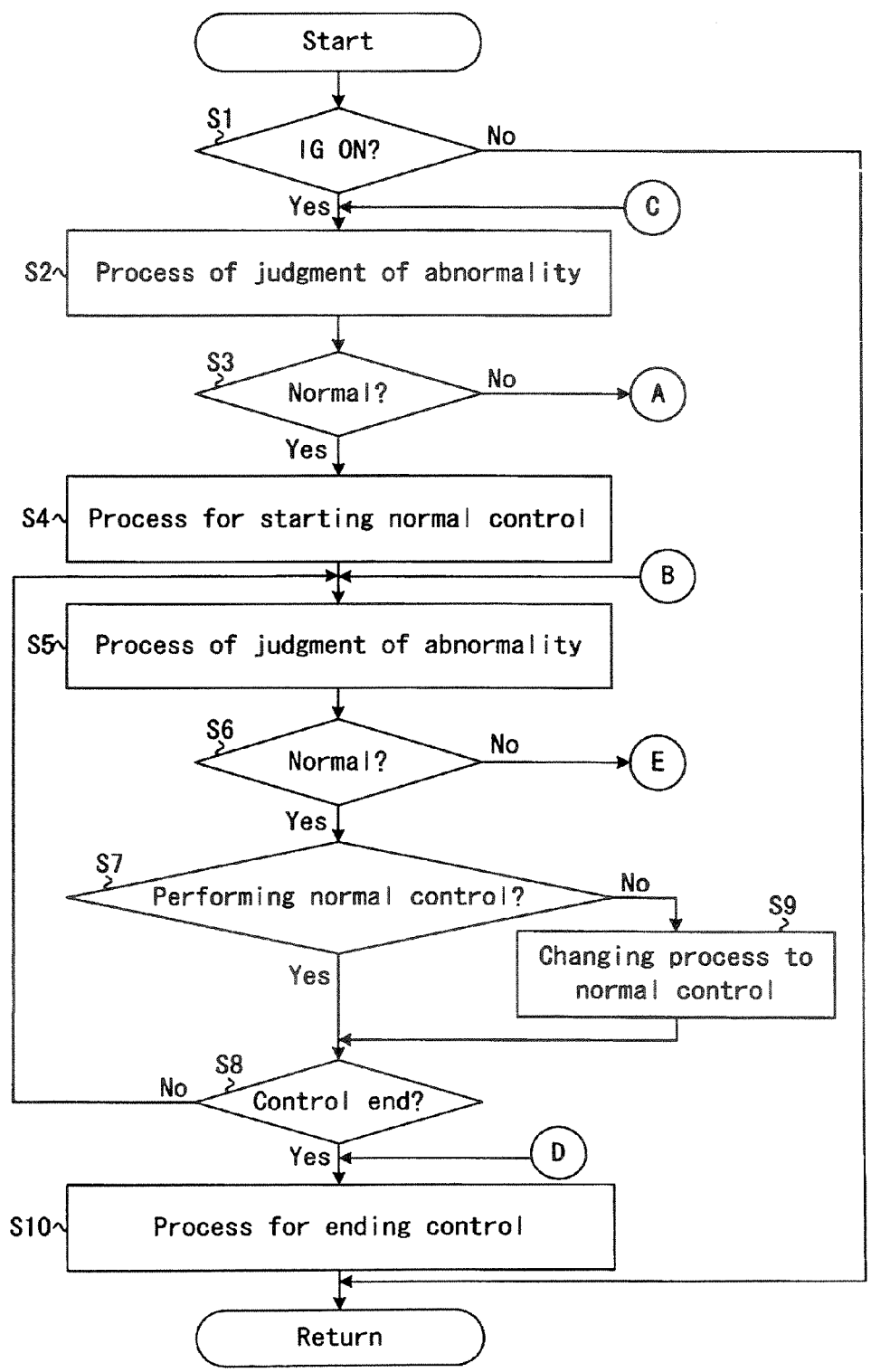
FIG. 2 represents a flow chart illustrating processes of an EPS (Electric Power Steering) controller 20.
Figure 3:
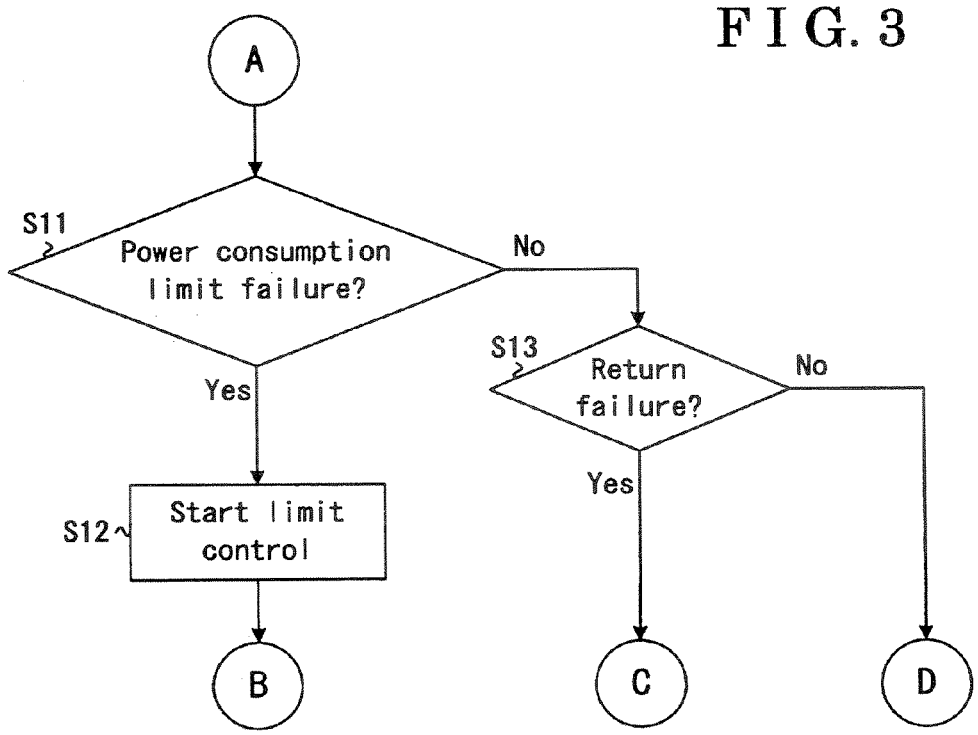
FIG. 3 represents a flow chart illustrating processes of the EPS controller 20.
Figure 4:
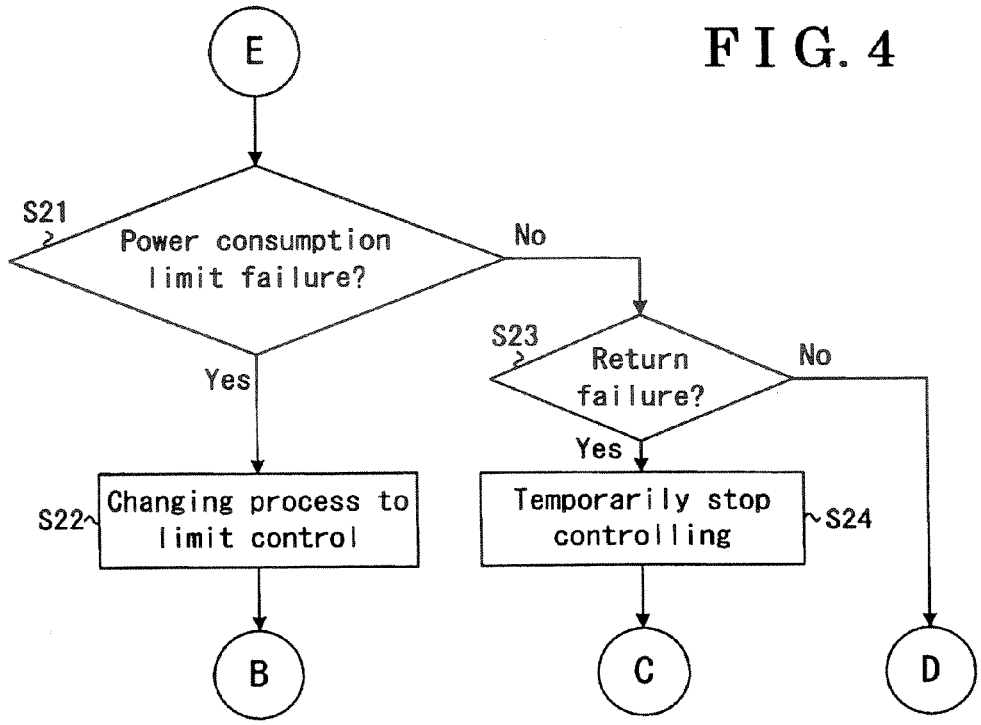
FIG. 4 represents a flow chart illustrating processes of the EPS controller 20

Further, the EPS controller 20 receives abnormality information from the power supply source 10. Then, the EPS controller 20 performs judgment of abnormality on the basis of the abnormality information. Here, processes of the EPS controller 20 will be explained in detail with reference to FIGS. 2 to 4. FIGS. 2 to 4 represent flow charts illustrating processes of the EPS controller 20.

As illustrated in FIGS. 2 to 4, at first, the EPS controller 20 judges whether an ignition switch was switched on (IGON) or not (step S1). In a situation where a judgment result of this is IG ON (step S1: Yes), the EPS controller 20 performs a process of judgment of abnormality before starting of the controlling (step S2). The process of judgment of abnormality in the step S2 corresponds to an initial check of the EPS controller 20. The process of judgment of abnormality is a process for judging whether the power supply source 10 is abnormal or not on the basis of the abnormality information.

Classification of abnormality in the process of judgment of abnormality is listed in Table 1. In other words, as shown in Table 1, kinds of abnormality are classified into an end failure, a power consumption limit failure and a return failure according to abnormal state conditions. In the meantime, situations other than those shown in Table 1 are judged as normal.

TABLE 1

| Abnormal state | Classification of abnormality |
| --- | --- |
| Abnormality of driving circuit (overcurrent, overvoltage) | End failure |
| Abnormality of microcomputer, Abnormality of EEPROM | Power consumption limit failure |
| Abnormality of external device requirement | Return failure |
| Abnormality of overheat protection 1 (low temperature) | Power consumption limit failure |
| Abnormality of overheat protection 2 (high temperature) | Return failure |

Here, an order of levels of abnormality of the end failure, the power consumption limit failure and the return failure listed in the classification of abnormality in Table 1 is as follows. At first, a level of abnormality of abnormal states classified into the end failure is the highest. A level of abnormality of abnormal states classified into the return failure is the second highest. A level of abnormal states classified into the power consumption limit failure is the lowest.

Explanations of the abnormality of the driving circuit, the abnormality of the microcomputer, the abnormality of the EEPROM, the abnormality of the external device requirement and the abnormality of overheat protection in the abnormal states have been made above.

Then, in a situation where a result of the process of judgment of abnormality before the starting of the controlling is normal (step S3: Yes), the EPS controller 20 performs a process for starting normal control (step S4). Here, the normal control is a control method, which is counterpart to a limit control described below. However, the normal control is different from the limit control in that power consumption is not limited.

Next, after the EPS controller 20 starts the normal control, the EPS controller 20 performs a process of judgment of abnormality during the controlling (step S5). The process of judgment of abnormality during the controlling in the step S5 is, similarly to the process of judgment of abnormality before the starting of the controlling in the step S2 described above, a process for judging whether the power supply source 10 is abnormal or not on the basis of the abnormality information. Then, the classification of abnormality in the process of judgment of abnormality during the controlling in the step S5 is listed in Table 1 described above.

Then, in a situation where a result of the process of judgment of abnormality during the controlling is normal (step S6: Yes), the EPS controller 20 judges whether the EPS controller 20 is performing the normal control or not (step S7). Then, in a situation where the EPS controller 20 is performing the normal control (step S7: Yes), the EPS controller 20 judges whether a control end signal is outputted or not (step S8). In a situation where the control end signal is outputted (step S8: Yes), the EPS controller 20 performs a process for ending the control (step S10). Then, the EPS controller 20 ends processing. In the meantime, for example, OFF signal of the ignition switch serves as the control end signal. Further, in the step S8, in a situation where the control end signal is not outputted (step S8: No), in other words, in a situation where the ignition switch is not switched off, the EPS controller 20 goes back to the step S5, and repeats the processes. In other words, the EPS controller 20 performs the process of judgment of abnormality during the controlling again. If the judgment result is normal, the EPS controller 20 continues the normal control.

On the other hand, in the step S7, in a situation where the EPS controller 20 is not performing the normal control (step S7: No), in other words, the EPS controller 20 is performing the limit control, the EPS controller 20 performs a changing process from the limit control to the normal control (step S9), and the EPS controller 20 moves on to step S8. In other words, if the judgment result is normal in the process of judgment of abnormality during the controlling in a situation where the EPS controller 20 is performing the limit control, the EPS controller 20 changes the control method from the limit control to the normal control.

Further, in a situation where the judgment result is not normal in the process of judgment of abnormality before the starting of the controlling in the step S2, the judgment result is "not normal" in step S3 (step S3: No).

Then, the EPS controller 20 judges whether the classification of abnormality is the power consumption limit failure or not (step S11 as shown in FIG. 3). In a situation where the classification of abnormality is the power consumption limit failure (step S11: Yes) (in other words, when the power supply source 10 is in a third abnormal state, in a state that the power supply source 10 is recoverable to the normal state, before the starting of the controlling), the EPS controller 20 starts the limit control (step S12). The limit control is a control method for controlling the assisting electric motor 30 in a state where a maximum power consumption of the assisting electric motor 30 is limited (in other words, the EPS controller 20 starts the controlling of the assisting electric motor 30 with a limited power supply). The maximum power consumption in this case is, for example, approximately half of a maximum power consumption in the normal control. Then, after the EPS controller 20 starts the limit control, the EPS controller 20 proceeds to the process of judgment of abnormality during the controlling described above (step S5). In other words, in a situation where the classification of abnormality is judged as the power consumption limit failure in the process of judgment of abnormality before the starting of the controlling, the EPS controller 20 starts the controlling of the assisting electric motor 30 as the limit control, in which the power consumption is limited.

On the other hand, in a situation where the classification of abnormality is not the power consumption limit failure (step S11: No), the EPS controller 20 judges whether the classification of abnormality is the return failure or not (step S13). Then, in a situation where the classification of abnormality is the return failure (step S13: Yes), the process of judgment of abnormality before the starting of the controlling is performed again (step S2). In other words, in a situation where the classification of abnormality is judged as the return failure in the process of judgment of abnormality before the starting of the controlling (in other words, when the power supply source 10 is in a second abnormal state, in a state that the power supply source 10 is recoverable to the normal state, before the starting of the controlling, a level of abnormality of the power supply source 10 is lower in the third abnormal state than in the second abnormal state), the EPS controller 20 temporarily waits for the starting of the controlling of the assisting electric motor 30. After that, in a situation where the judgment result is normal, or, in a situation where the judgment result is the power consumption limit failure, the EPS controller 20 starts performing the normal control or the limit control. Accordingly, in a situation where the abnormal state is judged as the return failure, the EPS controller 20 temporarily waits for the starting of the control until the judgment result becomes normal (in other words, until the power supply source 10 returns to the normal state from the second abnormal state) or the power consumption limit failure.

Further, in a situation where the classification of abnormality is not the power consumption limit failure and not the return failure (step S13: No), in other words, in a situation where the classification of abnormality is the end failure (in other words, when the power supply source 10 is in a first abnormal state, in a state that the power supply source 10 is non-recoverable to the normal state, before the starting of the controlling), the EPS controller 20 performs a process for ending the control (step S10). Steps S11 and S13 therefore comprise an example of means for determining when the power supply source is in a first abnormal state or a second abnormal state. In other words, in a situation where the classification of abnormality is judged as the end failure in the process of judgment of abnormality before the starting of the controlling, the EPS controller 20 does not start the controlling of the assisting electric motor 30 and the EPS controller 20 stops operating (in other words, the EPS controller 20 stops operating and keeps the assisting electric motor 30 to be under a non-starting state).

Further, in a situation where the judgment result is not normal in the process of judgment of abnormality during the controlling in the step S5, the EPS controller 20 performs following processes. In this case, in the step S6, the judgment result is "not normal" (step S6: No). Then, the EPS controller 20 judges whether the classification of abnormality is the power consumption limit failure or not (step S21). In a situation where the classification of abnormality is the power consumption limit failure (step S21: Yes) (in other words, when the power supply source 10 is in the third abnormal state, in the state that the power supply source 10 is recoverable to the normal state), the EPS controller 20 performs a changing process to the limit control (step S22) (in other words, the EPS controller 20 controls the assisting electric motor 30 being controlled with a limited power supply). Then, after the change to the limit control, the EPS controller 20 proceeds to the process of judgment of abnormality during the controlling described above (step S5). In other words, in a situation where the classification of abnormality is judged as the power consumption limit failure in the process of judgment of abnormality during the controlling, the EPS controller 20 changes the control method to the limit control of the assisting electric motor 30 from the normal control of the assisting electric motor 30.

On the other hand, in a situation where the classification of abnormality is not the power consumption limit failure (step S21: No), the EPS controller 20 judges whether the classification of abnormality is the return failure or not (step S23). Then, in a situation where the classification of abnormality is the return failure (step S23: Yes) (in other words, when the power supply source 10 is in the second abnormal state, in the state that the power supply source 10 is recoverable to the normal state, a level of abnormality of the power supply source 10 is lower in the third abnormal state than in the second abnormal state), the EPS controller 20 temporarily stops the controlling of the assisting electric motor 30 (step S24). After that, the EPS controller 20 performs the process of judgment of abnormality before the starting of the controlling again (step S2). In other words, in a situation where the classification of abnormality is judged as the return failure in the process of judgment of abnormality during the controlling, the EPS controller 20 temporarily stops the controlling of the assisting electric motor 30 and the EPS controller 20 waits until the EPS controller 20 turns to a state where the EPS controller 20 can start the controlling. After that, in a situation where the judgment result is normal or in a situation where the judgment result is the power consumption limit failure, the EPS controller 20 starts the normal control or the limit control. In other words, in a situation where the classification of abnormality is judged as the return failure, the EPS controller 20 temporarily stops the controlling of the assisting electric motor 30 being controlled until the judgment result becomes normal (in other words, until the power supply source 10 returns to the normal state from the second abnormal state) or the power consumption limit failure.

Further, in a situation where the classification of abnormality is not the power consumption limit failure and is not the return failure (step S23: No), in other words, in a situation where the classification of abnormality is the end failure (in other words, when the power supply source 10 is in the first abnormal state, in the state that the power supply source 10 is non-recoverable to the normal state), the EPS controller 20 performs the process for ending the control (step S10). Steps S21 and S23 therefore comprise another example of means for determining when the power supply source is in a first abnormal state or a second abnormal state. In other words, in a situation where the classification of abnormality is judged as the end failure in the process of judgment of abnormality during the controlling, the EPS controller 20 completely stops the controlling of the assisting electric motor 30 being controlled and the EPS controller 20 stops operating.

As explained above, in situations where the state of abnormality of the power supply source is the power consumption limit failure and the return failure, the EPS controller 20 does not completely stop the controlling of the assisting electric motor 30 and can continue the controlling. In other words, functions of the electric power steering system are retained as much as possible. Further, in a situation where the state of abnormality of the power supply source is the power consumption limit failure, the EPS controller 20 continues the controlling of the assisting electric motor 30 though power consumption is limited. In other words, though assisting steering force from the assisting electric motor 30 becomes lower, in comparison with a situation where there is no assisting steering force from the assisting electric motor 30, steering feeling can be more preferable. Therefore, according to the electric power steering system of the embodiment, steering feeling can be preferable with reliability.

According to a first aspect of the present invention, an electric power steering system includes an assisting electric motor for assisting steering force according to a vehicle speed and a steering torque, a power supply source and an electric power steering controlling portion for supplying power to the assisting electric motor from the power supply source for controlling the assisting electric motor. The electric power steering controlling portion completely stops the controlling of the assisting electric motor being controlled and stops operating when the power supply source is in a first abnormal state and temporarily stops the controlling of the assisting electric motor being controlled until the power supply source returns to a normal state from a second abnormal state when the power supply source is in the second abnormal state.

In other words, according to abnormal state conditions of the power supply source, there are situations where the electric power steering controlling portion completely stops the controlling of the assisting electric motor and stops operating and where the electric power steering controlling portion temporarily stops the controlling of the assisting electric motor Conventionally, in a situation where the power supply source turns to an abnormal state, as described above, regardless of abnormal state conditions, the electric power steering controlling portion completely stops the controlling of the assisting electric motor and stops operating. However, in the electric power steering system according to the aspect of the present invention, according to abnormal state conditions of the power supply source, the electric power steering controlling portion only temporarily stops the controlling of the assisting electric motor. In a situation where the power supply source returns to the normal state, the electric power steering controlling portion can perform the controlling of the assisting electric motor. Thus, a state where the electric power steering system is functioning can be retained as much as possible.

In the meantime, the power supply source in the first abnormal state is defined to be in a state that the power supply source is non-recoverable to the normal state. The power supply source in the second abnormal state is defined to be an example of states that the power supply source is recoverable to the normal state. In other words, a level of abnormality is higher in the first abnormal state than in the second abnormal state. The first abnormal state is an abnormal state, which directly influences a voltage outputted to the assisting electric motor, for example, an abnormal state of a driving circuit, which configures the power supply source, or the like.

The second abnormal state is an abnormal state, which does not directly influence a voltage outputted to the assisting electric motor, for example, a situation where the driving circuit, which configures the power supply source, is highly overheated, and a situation where an operation of the driving circuit becomes unstable, or the like. Further, in a situation where the power supply source is commonly utilized by a device other than the assisting electric motor, the second abnormal state includes a state, in which the power supply source cannot supply power to the assisting electric motor because the power supply source is supplying power to another device in response to a request from another device. In other words, in response to the request from another device to the power supply source, the electric power steering controlling portion temporarily stops the controlling of the assisting electric motor. Then, in a situation where another device ceases the request to the power supply source, the electric power steering controlling system resumes the controlling of the assisting electric motor.

Here, in the above description, the processes described above were applied to the electric power steering controlling portion during the controlling of the assisting electric motor. However, similar processes can be applied to the electric power steering controlling portion before the starting of the controlling of the assisting electric motor. In other words, according to a second aspect of the present invention, the electric power steering controlling portion keeps the assisting electric motor to be under a non-starting state and stops operating when the power supply source is in the first abnormal state before starting of the controlling and temporarily waits for the starting of the controlling of the assisting electric motor until the power supply source returns to the normal state from the second abnormal state when the power supply source is in the second abnormal state before the starting of the controlling.

Here, the time before the starting of the controlling of the assisting electric motor includes a time immediately after an ignition switch is switched on and before the electric power steering controlling portion starts the controlling of the assisting electric motor and a time after the electric power steering controlling portion temporarily stops the controlling of the assisting electric motor and before the electric power steering controlling portion starts the controlling of the assisting electric motor.

In other words, as described above, before the starting of the controlling of the assisting electric motor, according to abnormal state conditions of the power supply source, there are situations where the electric power steering controlling portion stops operating and keeps the assisting electric motor to be under the non-starting state and where the electric power steering controlling portion temporarily waits for the starting of the controlling of the assisting electric motor. Thus, according to abnormal state conditions of the power supply source, the electric power steering controlling portion only temporarily waits for the starting of the controlling of the assisting electric motor. In a situation where the power supply source returns to the normal state, the electric power steering controlling portion can start the controlling of the assisting electric motor. In other words, a state where the electric power steering system functions can be retained as much as possible.

Further, in the above description, the second abnormal state was taken as an example of abnormal states. However, abnormal states, which can return to the normal state, can be classified into plural classes corresponding to levels of abnormality. For example, the abnormal states can be classified into the second abnormal state, a third abnormal state, or the like. Here, the third abnormal state is a state, in which a level of abnormality is lower than that of the second abnormal state. Then, the third abnormal state is, for example, a state where the electric power steering controlling portion does not stop the controlling of the assisting electric motor even in a situation where the power supply source is in an abnormal state and the electric power steering controlling portion can operate the assisting electric motor while power consumption of the assisting electric motor is limited to a small value.

In other words, according to a third aspect of the present invention, the electric power steering controlling portion controls the assisting electric motor being controlled with a limited power supply when the power supply source is in a third abnormal state. For example, assuming that power consumption of the assisting electric motor is 1000W in a normal state, the electric power steering controlling portion performs the controlling of the assisting electric motor with power consumption of 500W as an upper limit in a situation of the third abnormal state.

As described above, abnormal states, in which the power supply source can return to a normal state, are classified into a situation where the electric power steering controlling portion temporarily stops the controlling of the assisting electric motor and a situation where the electric power steering controlling portion does not stop the controlling of the assisting electric motor and controls the assisting electric motor even with small power consumption. Accordingly, though power consumption is small, a state where the electric power steering controlling portion controls the assisting electric motor, in other words, a state where the electric power steering system functions can be retained as much as possible.

In the meantime, the third abnormal state is, for example, a situation where the driving circuit, which configures the power supply source, slightly overheats in comparison with the normal state, or the like. In this situation, when the power consumption of the assisting electric motor becomes small, a level of current flowing in a circuit, which configures the power supply source, becomes small, whereby effects of overheat protection is produced. As a result, a level of overheat of the driving circuit, which configures the power supply source, can be lowered, and the power supply source can return to the normal state.

Further, similar to the above description, the third abnormal state can also be applied to the electric power steering controlling portion before the starting of the controlling of the assisting electric motor. In other words, according to a fourth aspect of the present invention, the electric power steering controlling portion starts the controlling of the assisting electric motor with the limited power supply when the power supply source is in the third abnormal state before the starting of the controlling.

In other words, before the electric power steering controlling portion starts the controlling of the assisting electric motor, abnormal states, in which the power supply source can return to the normal state, are classified into a situation where the electric power steering controlling portion temporarily waits for the starting of the controlling of the assisting electric motor and a situation where the electric power steering controlling portion starts the controlling of the assisting electric motor in a state of small power consumption. Accordingly, according to abnormal state conditions of the power supply source, though the power consumption is small, a state where the electric power steering controlling portion controls the assisting electric motor, in other words, a state where the electric power steering system functions can be retained as much as possible.

According to each aspect of the present invention, in the electric power steering system, even in a situation where the power supply source turns to an abnormal state, according to abnormal state conditions, the electric power steering controlling portion does not completely stop the controlling of the assisting electric motor and a state where the electric power steering controlling portion operates can be retained.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An electric power steering system, comprising:
an assisting electric motor for assisting steering force according to a vehicle speed and a steering torque;
a power supply source; and
an electric power steering controlling portion for supplying power to the assisting electric motor from the power supply source for controlling the assisting electric motor, wherein
the electric power steering controlling portion includes means for determining when the power supply source is in a first abnormal state or a second abnormal state, and wherein
the electric power steering controlling portion completely stops the controlling of the assisting electric motor being controlled and stops operating when it is determined that the power supply source is in a first abnormal state, and temporarily stops the controlling of the assisting electric motor being controlled until the power supply source returns to a normal state from a second abnormal state when it is determined that the power supply source is in the second abnormal state.

2. The electric power steering system according to claim 1, wherein
the electric power steering controlling portion keeps the assisting electric motor under a non-starting state and stops operating when it is determined that the power supply source is in the first abnormal state before starting of the controlling1 and temporarily waits for the starting of the controlling of the assisting electric motor until the power supply source returns to the normal state from the second abnormal state when it is determined that the power supply source is in the second abnormal state before the starting of the controlling.

3. The electric power steering system according to claim 1, wherein
the electric power steering controlling portion controls the assisting electric motor being controlled with a limited power supply when it is determined that the power supply source is in a third abnormal state.

4. The electric power steering system according to claim 2, wherein
the electric power steering controlling portion controls the assisting electric motor being controlled with a limited power supply when it is determined that the power supply source is in a third abnormal state.

5. The electric power steering system according to claim 3, wherein
the electric power steering controlling portion starts the controlling of the assisting electric motor with the limited power supply when it is determined that the power supply source is in the third abnormal state before the starting of the controlling.

6. The electric power steering system according to claim 4, wherein
the electric power steering controlling portion starts the controlling of the assisting electric motor with the limited power supply when it is determined that the power supply source is in the third abnormal state before the starting of the controlling.

7. The electric power steering system according to claim 1, wherein
the power supply source in the first abnormal state is defined to be in a state that the power supply source is non-recoverable to the normal state and the power supply source in the second abnormal state is defined to be in a state that the power supply source is recoverable to the normal state.

8. The electric power steering system according to claim 2, wherein
the power supply source in the first abnormal state is defined to be in a state that the power supply source is non-recoverable to the normal state and the power supply source in the second abnormal state is defined to be in a state that the power supply source is recoverable to the normal state.

9. The electric power steering system according to claim 3, wherein
the power supply source in the first abnormal state is defined to be in a state that the power supply source is non-recoverable to the normal state, the power supply source in the second abnormal state is defined to be in a state that the power supply source is recoverable to the normal state, the power supply source in the third abnormal state is defined to be in a state that the power supply source is recoverable to the normal state and a level of abnormality of the power supply source is lower in the third abnormal state than in the second abnormal state.

10. The electric power steering system according to claim 4, wherein
the power supply source in the first abnormal state is defined to be in a state that the power supply source is non-recoverable to the normal state, the power supply source in the second abnormal state is defined to be in a state that the power supply source is recoverable to the normal state, the power supply source in the third abnormal state is defined to be in a state that the power supply source is recoverable to the normal state and a level of abnormality of the power supply source is lower in the third abnormal state than in the second abnormal state.

11. The electric power steering system according to claim 5, wherein
the power supply source in the first abnormal state is defined to be in a state that the power supply source is non-recoverable to the normal state, the power supply source in the second abnormal state is defined to be in a state that the power supply source is recoverable to the normal state, the power supply source in the third abnormal state is defined to be in a state that the power supply source is recoverable to the normal state and a level of abnormality of the power supply source is lower in the third abnormal state than in the second abnormal state.

12. The electric power steering system according to claim 6, wherein
the power supply source in the first abnormal state is defined to be in a state that the power supply source is non-recoverable to the normal state, the power supply source in the second abnormal state is defined to be in a state that the power supply source is recoverable to the normal state, the power supply source in the third abnormal state is defined to be in a state that the power supply source is recoverable to the normal state and a level of abnormality of the power supply source is lower in the third abnormal state than in the second abnormal state.

13. The electric power steering system according to claim 4, wherein
the first abnormal state comprises an abnormality of a driving circuit;
the second abnormal state comprises an abnormality of an external device requirement and an abnormality of overheat protection in high temperature; and
the third abnormality state comprises an abnormality of a microcomputer, an abnormality of an EEPROM and an abnormality of overheat protection in low temperature.

* * * * *